UNITED STATES PATENT OFFICE.

JAMES OTIS HANDY, OF EDGEWORTH, PENNSYLVANIA, ASSIGNOR TO PITTSBURG TESTING LABORATORY, LIMITED, OF PITTSBURG, PENNSYLVANIA.

PROCESS OF TREATING SLUDGE IN WATER-PURIFYING.

SPECIFICATION forming part of Letters Patent No. 654,393, dated July 24, 1900.

Application filed March 8, 1900. Serial No. 7,813. (No specimens.)

*To all whom it may concern:*

Be it known that I, JAMES OTIS HANDY, a citizen of the United States, residing at Edgeworth, in the county of Allegheny and State of Pennsylvania, have invented or discovered certain new and useful Improvements in the Treatment of Sludge, of which improvements the following is a specification.

It is customary in treating water containing carbonates of lime, magnesia, &c., to add lime thereto for the purpose of precipitating the carbonates, the lime being obtained by burning limestone. The sludge containing or formed largely by the precipitates is drawn off from the settling-tanks and thrown away. This method is expensive and wasteful, as a large quantity of lime must be kept on hand, involving frequently the transportation of the lime or limestone from distant points, and the sludge, which contains large quantities of lime capable of being cheaply restored to useful or active conditions, is thrown away.

The object of the invention described herein is to provide for the removal from the sludge of the carbonate of magnesia and the subsequent filtering, pressing, drying, and burning of the revivified lime. The invention is hereinafter more fully described and claimed.

In the practice of my invention the sludge containing insoluble carbonates of lime, magnesia, &c., is drawn off from the settling-tank of the water-treating plant into a suitable tank or receptacle. The sludge is then charged with carbonic acid from any suitable source, but preferably from the kiln employed in reburning the lime, as will be hereinafter described. The injection of carbonic acid into the sludge, which is in a thin pasty condition and may be rendered more liquid by the addition of water, will render the carbonates of lime and magnesia soluble. As the carbonate of magnesia is more soluble than the carbonate of lime, the ratio being about two hundred (200) to one, (1,) a comparatively-small amount of water saturated with carbonic acid will take up the carbonate of magnesia from a large amount of sludge and that the amount of carbonate of lime taken up or dissolved will be comparatively insignificant. After the carbonate of magnesia has been dissolved the contents of the tank or receptacle are passed through a filter-press or other suitable form of separator to remove the solution of carbonate of magnesia. The solid portion of the sludge, consisting almost wholly of carbonate of lime, is then reburned, a continuous kiln being by preference employed for that purpose. In lieu of removing the magnesia solution mechanically, as by a filter-press, such separation may be effected by gravity and the solid portion be charged directly into a kiln of the rotary-cylinder type.

It is characteristic of this method that not only the lime which is charged into the water for purifying the same is recovered practically undiminished in quantity, but the lime contained in the water before purification is also recovered. Hence it is only necessary to obtain sufficient lime from an outside source to start the water purification, as thereafter more lime than can be utilized in the water-purification plant will be produced by described treatment of the sludge.

Most waters contain few impurities other than the carbonates of lime and magnesia in solution, and hence lime obtained in the manner described will be in a very pure condition, especially when the process has been carried on for a considerable length of time, so that whatever impurities may have been introduced at the initiation of the process by the use of impure lime are practically eliminated.

The water containing the carbonate of magnesia after being separated from the sludge, as heretofore stated, is subjected to a high heat or a suitable material, as lime, is added to such solution to effect a precipitation of the carbonate of magnesia. The treated material is then passed through a filter-press or other separator, whereby the water is removed from the precipitate, which is then dried and calcined.

The carbonic-acid gas for the primary treatment of the sludge for the separation of the carbonate of magnesia from the carbonate of lime may conveniently be obtained from the kilns employed for reburning the lime and magnesia.

I claim herein as my invention—

1. As an improvement in the art of treating sludge obtained in the purification of water, the method herein described, which consists in impregnating the sludge with carbonic acid, whereby the carbonate of magnesia is rendered soluble, separating the solution so formed from the sludge, and then reburning or calcining the sludge, substantially as set forth.

2. As an improvement in the art of treating sludge obtained in the purification of water, the method herein described, which consists in impregnating the sludge with carbonic acid, whereby the carbonate of magnesia is rendered soluble, separating the solution so formed from the sludge, and finally precipitating the carbonate of magnesia in the solution and removing the water therefrom, substantially as set forth.

In testimony whereof I have hereunto set my hand.

JAMES OTIS HANDY.

Witnesses:
DARWIN S. WOLCOTT,
F. E. GAITHER.